United States Patent [19]
Koken

[11] Patent Number: 5,162,745
[45] Date of Patent: Nov. 10, 1992

[54] MULTICHANNEL SINE SYNTHESIZER

[75] Inventor: Claus Koken, Hamburg, Fed. Rep. of Germany

[73] Assignee: U.S. Philips Corporation, New York, N.Y.

[21] Appl. No.: 649,087

[22] Filed: Jan. 31, 1991

[30] Foreign Application Priority Data

Jan. 31, 1990 [DE] Fed. Rep. of Germany ........ 4002737

[51] Int. Cl.$^5$ .................. H03B 19/00; H03L 7/00
[52] U.S. Cl. .................................. 328/14; 328/22; 307/271; 307/529
[58] Field of Search .................. 328/14, 15, 16, 23, 328/22; 307/271, 522, 529; 381/28, 29; 332/119, 120; 84/625

[56] References Cited

U.S. PATENT DOCUMENTS

| | | | |
|---|---|---|---|
| 3,654,450 | 4/1972 | Webb | 328/14 |
| 3,657,657 | 4/1972 | Jefferson | 328/14 |
| 3,845,395 | 10/1974 | Murphree | 328/14 |
| 4,003,003 | 1/1977 | Haeberlin | 328/14 |
| 4,454,486 | 6/1984 | Hassun et al. | 328/14 |
| 4,700,390 | 10/1987 | Machida | 328/14 |
| 4,740,995 | 4/1988 | Schevin et al. | 328/14 |
| 4,839,603 | 6/1989 | Mower et al. | 328/15 |
| 4,845,436 | 7/1989 | Kobayashi et al. | 328/14 |
| 4,878,027 | 10/1989 | Carp et al. | 328/15 |

Primary Examiner—Janice A. Howell
Assistant Examiner—Sinh N. Tran
Attorney, Agent, or Firm—Bernard Franzblau

[57] ABSTRACT

A multichannel sine synthesizer for the primary signal production in measuring signal generators having a phase accumulator (11), a low-pass filter (12), an interposed first synthesis channel (13) and a clock control unit (25) which together convert a phase increment applied to the phase accumulator (11) into a sinusoidal signal. A problem in such synthesizers is the comparatively low maximum frequency of the sinusoidal signal produced because this frequency is limited by alias frequency effects. This is the reason why, in order to increase the maximum frequency with the same clock frequency, there is connected parallel to the synthesis channel (13) at least one further modified synthesis channel (26), which operates so as to be shifted in the time and to the input side of which is applied an additive phase value constant with a given frequency. Furthermore, via the clock control unit, each further synthesis channel (26) receives a clock signal individually shifted in time so that at the output of a summator (15) a sinusoidal signal appears. This signal has a maximum frequency increased by a multiple with respect to the monochannel synthesizer (13). The operative (Nyquist) sampling rate is increased proportionally to the parallel synthesis channels (26) and a sufficient attenuation of the alias frequency components is obtained by the low-pass filter (12).

19 Claims, 1 Drawing Sheet

MULTICHANNEL SINE SYNTHESIZER

BACKGROUND OF THE INVENTION

This invention relates to multichannel sine synthesizer for primary signal production in measuring signal generators comprising a phase accumulator, a low-pass filter, an interposed synthesis channel and a clock control unit for converting a phase increment applied to the phase accumulator into a sine wave signal.

Synthesizers of this kind, i.e. sine wave generators based on the principle of digital signal synthesis, are known. From the magazine "Elektronik 1976", part II, pp. 106 to 110, principles of digital synthesizers are known. Such synthesizers have a digital phase accumulator, a synthesis channel and an analog low-pass filter. The synthesis channel can be composed of a series arrangement of a sawtooth-to-sine converter and of a digital-to-analog converter (DAC). An enumerated phase increment is converted by the phase accumulator into a sequence of phase values. The advancement rate is then the clock frequency of a clock control unit. On account of the finite range of values of the phase accumulator, according to value a sequence of sawtooth-shaped phase values is obtained at the output of the phase accumulator. With a given clock frequency, the phase increment therefore determines the output frequency of the sine signal. Consequently, with sine synthesizers variable in frequency the output frequency, which is identical to the fundamental frequency of the sawtooth-shaped sequence of phase values, is controlled proportionally through the phase increment. The sawtooth-to-sine converter converts the individual elements of the sequence of phase values occurring on the input side to corresponding sine function values. The digital-to-analog converter converts these sine function values into linearly assigned voltage or current values. The resulting output signal represents a sample-and-hold function of a sinusoidal signal because the individual supporting values are kept constant within the sampling period. Efficaciously, this is realized by means of a clocked transfer memory of the digital-to-analog converter. For a phase increment $\phi$ larger than or equal to unity, i.e. the least significant bit (LSB) of the phase accumulator output, sampling and clocking periods are identical. The effective amplitude of the sinusoidal signals then depends according to $\sin(\pi f_N/f_T)/(\pi f_N/f_T)$ upon the ratio between the effective frequency $f_N$ and the clock frequency $f_T$. The low-pass filter at the output of the synthesizer serves to attenuate the alias frequency components contained in the output signal of the digital-to-analog converter. The component both highest and lowest in frequency lies at a frequency formed from the difference between the clock frequency $f_T$ and the effective frequency $f_N$. In order to achieve sufficient attenuation with the use of a reasonable amount of filtering means, as a maximum effective frequency $f_{Nmax}$ of synthesizers variable in frequency, in general a quarter of the clock frequency $f_T$ is fixed so that the critical alias frequency is at least twice the maximum effective frequency $f_{Nmax}$ and therefore lies a frequency octave above the maximum frequency. The relative effective amplitude is then, according to the aforementioned formula, about 91% of the effective amplitude with low frequencies. An amplitude compensation of up to 100% can be effected with synthesizers variable in frequency by an increase in height of the transmission band of the low-pass filter. An increase of the effective frequency $f_{Nmax}$ through, for example, $f_T/4$ with an additional amplitude compensation is limited because of the approximation to the critical alias frequency $f_T-f_{Nmax}$.

From European Patent Specification 0 078 588 (corresponding to U.S. Pat. No. 4,454,486), a device and a method for synthesizing a signal waveform are known. In this variation of a multichannel synthesizer operating by means of a combination of digital signals shifted in time, in the end a high-frequency output signal is produced in which the digital signals shifted in time are supplied to a multiplexer and are then finally converted via a digital-to-analog converter into the desired signal. In such a digital synthesizer, with respect to the dynamic range, more stringent requirements are imposed on the multiplexer and on the digital-to-analog converter as the number of sampled channels is increased. More particularly, the time of conversion of the digital-to-analog converter must be adapted to the sampling period of the multiplexer.

SUMMARY OF THE INVENTION

The invention has for its object to provide a multichannel sine synthesizer which, with approximately unchanged dynamic requirements with respect to the synthesis channel and with a given clock frequency, guarantees a substantial increase of the maximum frequency of the sinusoidal signal to be produced.

According to the invention, this object is achieved in that parallel to the interposed synthesis channel at least one further modified synthesis channel, is connected. This further channel is connected on the output side through a device, which operates so as to be shifted in time and to which on the input side moreover a frequency-dependent constant phase value is applied, which receives through the clock control unit a clock signal adapted in time, and in that the sinusoidal signal has a maximum frequency increased in dependence upon the parallel synthesis channel with respect to the monochannel synthesis channel.

The multichannel sine synthesizer according to the invention permits a substantial increase of the maximum effective frequency $f_{Nmax}$ with respect to a quarter of the clock frequency $f_T$ because the critical lowest alias frequency is increased from $f_T-f_{Nmax}$ to $Kf_T-f_{Nmax}$, K representing the number of the parallel-connected synthesis channels. The practically utilized increase of the effective frequency $f_N$ depends upon the still acceptable degradation of the effective amplitude with $f_N$ according to $\sin(\pi f_N/f_T)/(\pi f_N/f_T)$. With synthesizers variable in frequency, a doubling of the maximum frequency with $K=2$ or $K=3$ and at most a tripling with $K=3$ or $K=4$ can suffice so that in the first case with a maximum effective frequency $f_{Nmax}$ corresponding to half the clock frequency $f_T$ an amplitude drop to about 64% and in the second case with a maximum effective frequency $f_{Nmax}$ of three quarters of the clock frequency $f_T$ an amplitude drop to 30% must be compensated.

According to the invention, each synthesis channel has a sawtooth-to-sine converter and a digital-to-analog converter comprising a clocked transfer memory. Each of the parallel-connected synthesis channels has a sawtooth-to-sine converter, which is preceded by an adding member. The parallel-connected synthesis channels operate by samplings delayed with different times.

According to a preferred embodiment of the invention, an individual phase value $\phi$ according to $(i-1)\phi/K$ is applied to the input of each parallel synthesis channel, $\phi$ being the phase increment applied to phase accumulator and i=1, 2, 3 ..., K represents a continuous enumeration of the synthesis channels. The low-pass filter is connected on the input side through a summing member to the outputs of the synthesis channels. The clocking of the transfer memories of the digital-to-analog converters takes place with a time shift according to $(i=1)T_T/K$, $T_T=1/f_T$ being the clock period. Advantageously, further collecting memories or transfer memories may be arranged in the synthesis channels in order to guarantee a perfect clocking.

Advantageously, it may further be ensured that the sawtooth-to-sine converters may be constructed as read-only memories (ROM's) or random access memories (RAM's), as a result of which also other arbitrary signal-time functions also may be synthesized as sinusoidal functions.

According to a particular embodiment of the invention, the clock control unit clocks the phase accumulator and the synthesis channels and supplies to the transfer memories of the digital-to-analog converters a clock signal delayed by $(i-1)T_T/K$ for each $i^{th}$ synthesis channel.

Advantageously, it may be ensured that the adding member has a subtracting function. In that case the clock control unit clocks in the end the $i^{th}$ synthesis channel with a delay of $(K-i)T_T/K$.

According to a further alternative preferred embodiment of the invention, the clock control unit supplies the phase accumulator with a clock signal and supplies the synthesis channels with time clock signals. For the delay in time of the synthesis channels with respect to each other an analog dead time member having the clock time $(i-1)T_T/K$ is assigned to each of the parallel synthesis channels.

Advantageously, each dead time member may be constructed as a delay line with distributed passive network elements dL/dx and dC/dx, where L represents inductance, C represents capacitance and dx represents a differential unit length.

Advantageously, the rise and fall times of the digital-to-analog converters may be chosen so as to be short with respect to the quotient of the clock signal period $T_T$ and the factor K in order to avoid a reduction of the yield in effective amplitude.

Further preferred embodiments of the invention appear in the dependent claims.

BRIEF DESCRIPTION OF THE DRAWINGS

An embodiment of the invention will now be described more fully with reference to the accompanying drawing, in which.

DETAILED DESCRIPTION OF THE PREFERRED EMBODIMENTS

Figure 1:
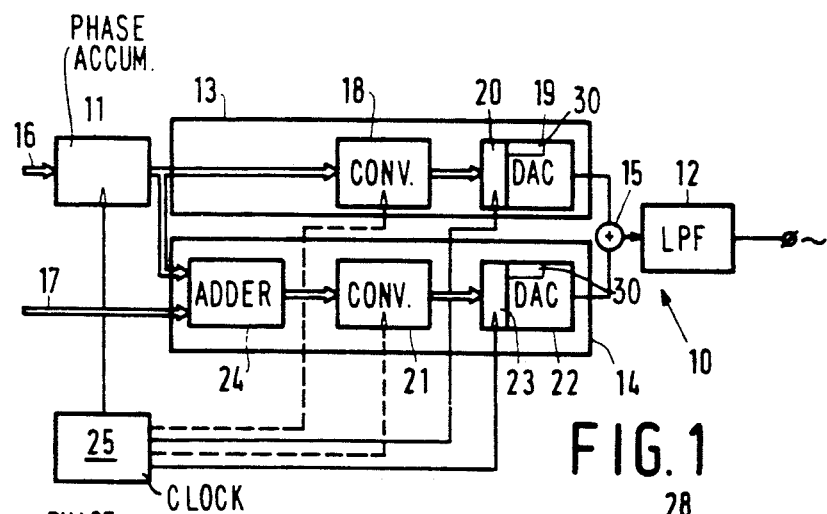
FIG. 1 shows a two-channel sine synthesizer according to the invention comprising a clock control unit which produces for the delayed channel a lagging clock signal.

FIG. 1 shows a two-channel sine synthesizer 10 comprising a first synthesis channel 13, which is connected between a phase accumulator 11 and a low-pass filter 12 and which receives at its input side the output signal of the phase accumulator 11. A second synthesis channel 14 is arranged parallel to the first synthesis channel 13. It is apparent from the parallel arrangement that the second synthesis channel 14 also receives the input signal of the synthesis channel 13 and is combined on the output side with the output signal of the first synthesis channel 13. The outputs of the synthesis channels 13, 14 are combined through a summation member 15.

The output signal of the summation member 15 is connected to the input of the low-pass filter 12 whose output the smoothed sinusoidal signal is produced. The input signal of the phase accumulator is an enumerated phase increment $\phi$, which is designated in the Figures by reference numeral 16. The input side of the second synthesis channel 14 additionally receives a frequency-dependent constant phase value, which in the Figures is designated by reference numeral 17. With several additional parallel-connected synthesis channels, the phase values 17 of the synthesis channels are different, as will be explained more fully hereinafter.

The first synthesis channel 13 essentially comprises a series arrangement of a sawtooth-to-sine converter 18 and a digital-to-analog converter 19 which may include at the input side a transfer memory 20.

The sawtooth-to-sine converter 18 converts the signals or signal values supplied to it, i.e. the sequence of phase values, into corresponding sine function values. It may be internally constructed as a read-only memory (ROM) or as a random access memory (RAM), into which the sine function values are loaded. The phase values supplied to it represent the reading addresses of these memories. By storing other function values, arbitrary signal-time functions other than sinusoidal functions also may be synthesized.

The digital-to-analog converter 19 converts the signals supplied to it into linearly assigned voltage or current values, which are each time kept constant within a sampling period $T_T$. The resulting output signal $s_1(t)$ represents a sample-and-hold function of a sine oscillation, $s_0(t)=A_0 \sin(\omega_N t)$. A holding member is required to accomplish this end and is constituted by the transfer memory 20, which is arranged at the input of the digital-to-analog converter 19.

The second parallel-connected synthesis channel 14 also comprises a sawtooth-to-sine converter 21 and a following digital-to-analog converter 22 having a transfer memory 23. These members, which may correspond to the members 18, 19 and 20, are preceded by an adding member 24, which is supplied on the input side with the input signals already described.

The two-channel synthesizer 10 according to the invention also has a clock control unit 25, which supplies on the one hand the sawtooth-to-sine converters 18 and 21 and on the other hand the transfer memories 20 and 23 and the phase accumulator 11 with clock signals.

At the output of the second synthesis channel 14, a second sample-and-hold function $s_2(t)$ of the sine oscillation is therefore produced. The clock control unit 25 controls the samplings in a manner such that the sample-and-hold function $s_2(t)$ is delayed with respect to the sample-and-hold function $s_1(t)$ or its sampling instants by half a clock period $T_T$. This delay is obtained in that the transfer edges of the clock signal $s_T(t-T_T/2)$ for in the end the digital-to-analog converter 22 lag by half a clock period, i.e. $T_T/2$, with respect to the transfer edges of the clock signal $s_T(t)$ for in the end the digital-to-analog converter 19. The two clock signals $s_T(t)$ and $s_T(t-T_T/2)$ and the clock signals for the phase accumulator 11 and, as the case may be, the sawtooth-to-sine converters 18 and 21 are produced in the clock control unit. Since the samplings, i.e. the sampling instants of the synthesis channel 14 lag behind those of the synthesis channel 13 by $T_T/2$, the individual phase values supplied to the sawtooth-to-sine converter 21 must be increased each time by $\phi/2$, i.e. by half the phase increment $\phi$. This takes place in the adding member 24. In the summation member 15, the two sample-and-hold functions $s_T(t)$ and $s_2(t)$ are joined. The desired sine signal having the frequency $f_N$ is filtered out of the sum signal by a low-pass filtering in the low-pass filter 12, N representing the effective frequency.

Figure 2:
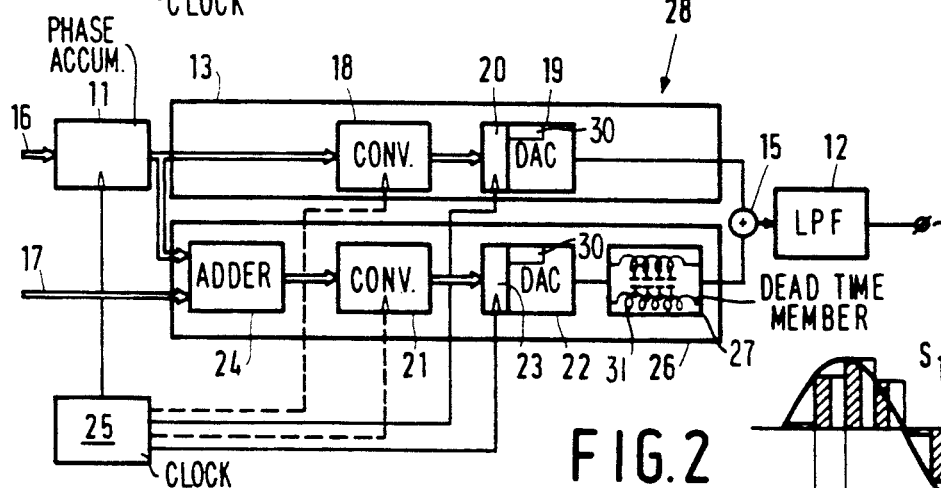
FIG. 2 shows a two-channel sine synthesizer according to the invention comprising a dead time member for a time delay.

FIG. 2 shows a two-channel sine wave synthesizer 28, which is a variation of the two-channel sine wave synthesizer 10 shown in FIG. 1. This advantageous variation of the multichannel synthesizer according to the invention is essentially distinguished only with respect to the method of delaying in time the samplings or the sampling instants of the second synthesis channel 26, whose construction otherwise corresponds to that of the synthesis channel 14, in comparison with the first synthesis channel 13. The delay in this embodiment takes place with coinciding clock signals for in the end the digital-to-analog converters 19 and 22 by an analog dead time member 27, which follows the digital-to-analog converter 22. Otherwise, the basic modes of operation are identical.

Advantages of this synthesizer 28 according to FIG. 2 as compared with that of FIG. 1 consist in that the effective delay time, which should be as exactly equal as possible to $T_T/2$, is due substantially exclusively to passive network elements. As a result, the delay time is more stable especially with respect to temperature influences. This is the case, for example, if the dead time member 27 is constructed as a delay line 31 with distributed passive network elements $dL/dx$ and $dC/dx$.

Further, the perfect timing of the two synthesis channels 13 and 26 is simplified, it being advantageous that as to the propagation delay times the two synthesis channels 13 and 26 differ from each other only with respect to the additional propagation delay time of the adding member 24 in the synthesis channel 26. It should be noted that, when a highest possible maximum frequency $f_N$ of the sinusoidal signal to be produced is indicated, the digital switching circuits of the two synthesis channels 13 and 26 are operated tendentially approximately to the clock frequency limit fixed by propagation delay times and transition times. In some cases, it may therefore be required to provide, besides the transfer memories 20 and 23 already present, additional collecting memories 30 connected to transfer memories.

Figure 3:
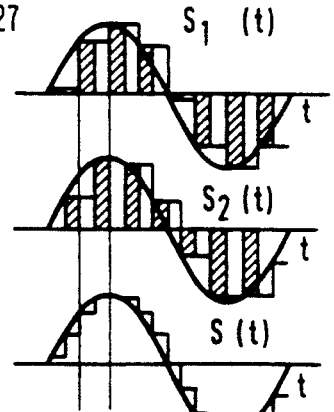
FIG. 3 shows two sample-and-hold functions of a summing member at the output of the synthesizers shown in FIGS. 1 and 2 and the sum of these sample-and-hold functions.

FIG. 3 shows the two sample-and-hold functions $s_1(t)$ and $s_2(t)$ for $f_T/f_N = 8$, for example, one below the other. Below the function $s_2(t)$ the sample-and-hold function $s(t)$ is shown, which is obtained for an imaginary sine synthesizer with double clock and sample frequency. The signal-time areas indicated by cross-hatched lines of $s_1(t)$ and $s_2(t)$ are composed in the envelope to $s(t)$. The remaining signal-time areas of $s_1(t)$ and $s_2(t)$ are identical to the signal-time area of $s(t-T_T/2)$, i.e. a sample-and-hold function $T_T/2$ of double the sample frequency delayed by $s(t)$.

Thus, it holds that $$s_1(t) + s_2(t) = s(t) + s(t - T_T/2).$$

The two synthesis channels 13 and 14 and 26, respectively, of the two-channel sine synthesizer, which act in time multiplex at the summation member 15, therefore increase the effective sampling rate by the factor 2. In the sum signal, the side frequencies of the odd-numbered clock frequency multiples are neutralized by compensation in the summation member 15 for the synthesis channels 13 and 14 and 26, respectively. The critical alias frequency is therefore $2f_T - f_N$ instead of $f_T - f_N$, as is the case with the synthesizer according to the prior art, and the maximum frequency can be increased with respect to the prior art to double the value, i.e. to $f_{Nmax} = f_T/2$.

The smaller yield in amplitude resulting according to $(\pi f_N/f_T)/(\pi f_N/f_T)$ with the maximum effective frequency $f_{Nmax}$ of 64% with respect to 91% with $f_{Nmax} = f_T/4$ is obtained in synthesizers variable in frequency by an increase in height of the transmission band of the low-pass filter (12).

In order that no substantial additional amplitude degradation occurs, the rise and fall times of the digital-to-analog converters must be short with respect to $T_T/2$ and short with respect to $T_T/K$, respectively, with the K-channel synthesizer. However, the relevant requirements are considerably less stringent than in the multichannel synthesizer according to the aforementioned European Patent Specification 0 078 588 because the individual sample value of each channel is operative through $T_T$.

Figure 4:
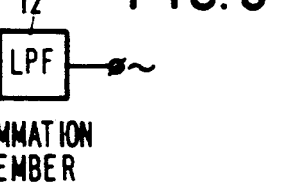
FIG. 4 shows a general K-channel sine synthesizer according to the invention.

FIG. 4 shows the multichannel sine wave synthesizer 30 according to the invention, which has an internal construction according to the variation in FIG. 2. The phase value, which is added to the $i^{th}$ synthesis channel through the respective adding member 24, is $(i-1)\phi/K$ if the undelayed interposed synthesis channel 13 is indicated by $i=1$. The dead times of the corresponding dead time members 27 are $(i-1)T_T/K$. The effective sample frequency is increased with respect to the monochannel synthesizer from $f_T$ to $Kf_T$, so that the critical lowest alias frequency lies at $Kf_T - f_{Nmax}$.

The features of the invention revealed in the above description, in the Figures and in the claims may be utilized both separately and in arbitrary combinations in order to realize the invention in its various embodiments.

I claim:

1. A multichannel sine synthesizer for deriving a primary signal comprising: a phase accumulator, a first synthesis channel, a summator member and a low-pass filter all together connected in cascade, first means for applying a phase increment signal to the phase accumulator, means connecting, in parallel to the first synthesis channel, at least one second synthesis channel which is modified and connected at its output side to the summator member second means for applying to an input of the at least one second a frequency-dependent constant phase value signal, and a clock control unit which applies to the first and at least one second further synthesis channels clock signals adapted in time so that an output signal of the at least one second synthesis channel is shifted in time relative to an output signal of the first synthesis channel, and wherein a sine signal is developed at an output of the low-pass filter which signal has a maximum frequency increased in dependence upon the parallel at least one second synthesis channel with respect to the first synthesis channel.

2. A synthesizer as claimed in claim 1, wherein each of the first and at least one second synthesis channel comprises a sawtooth-to-sine converter and a digital-to-analog converter having a clocked transfer memory, and wherein each parallel at least one second further synthesis channel includes an adding member preceding the sawtooth-to-sine converter and each parallel at least one second synthesis channel operates with samplings of different time delays.

3. A synthesizer as claimed in claim 2, wherein there are $K-1$ second synthesis channels which are connected parallel to the first synthesis channel, to the input side of each of which second synthesis channels is applied an individual frequency-dependent constant phase value signal according to $(i-1)\phi/K$, and wherein each $i^{th}$ second synthesis channel has a delayed clock period $T_T$, i being a positive integer from 1 to k and representing the continuous enumeration of the first and second synthesis channels and $\phi$ being the phase increment applied to the phase accumulator.

4. A synthesizer as claimed in claim 3, characterized in that in addition to the transfer memories further collecting memories are connected in the respective memories first and second synthesis channels in a manner to guarantee a perfect clocking.

5. A synthesizer as claimed in claim 3 wherein the sawtooth-to-sine converters comprise a read only memory (ROM) or a random access memory (RAM) whereby to synthesize arbitrary signal-time functions other than sinusoidal functions.

6. A synthesizer as claimed in claim 3 wherein the clock control unit clocks the phase accumulator and the first and second synthesis channels and supplies a clock signal to each transfer memory of the second synthesis channels, said clock signal being delayed by $(i-1)T_T/K$ to the corresponding second synthesis channels, where $T_T$ is the clock period.

7. A synthesizer as claimed in claim 3 wherein the clock control unit clocks the phase accumulator and the first and second synthesis channels and with a subtracting function of the adding member the $i^{th}$ synthesis channel is delayed with respect to the $K^{th}$ synthesis channel by $(K-i)T_T/K$ via a corresponding clock signal applied to the transfer memories.

8. A synthesizer as claimed in claim 2 wherein the clock control unit clocks the phase accumulator and supplies to at least each transfer memory clock signals equal in time, and for delaying in time the first and at least one second synthesis channels with respect to each other, said synthesizer further comprises a respective analog dead time member having a dead time $(i-1)T_T/K$ connected in each at least one second synthesis channel in cascade with at least its respective digital-to-analog converter.

9. A synthesizer as claimed in claim 8, wherein the dead time member comprises a delay line with distributed passive network elements $dL/dx$ and $dC/dx$.

10. A synthesizer as claimed in claim 3 wherein the switching times of the digital-to-analog converters are short with respect to the quotient of the respective clock signal period and the factor K, where K is the number of the first and second synthesis channels.

11. A multichannel waveform synthesizer comprising:
a phase accumulator having an input for receiving phase increment signals to be converted into an output signal waveform,
a first synthesis channel including a signal converter and a digital/analog converter (DAC) connected in cascade to an output of the phase accumulator,
at least one second synthesis channel which is modified and includes a signal converter and a digital-/analog converter (DAC) connected in cascade and with a first input coupled to the output of the phase accumulator,
a summation device having first and second inputs coupled to an output of the first synthesis channel and to an output of the at least one second synthesis channel, respectively,
a low-pass filter coupled between an output of the summation device and an output terminal of the waveform synthesizer,
means for applying a frequency-dependent constant phase value signal to a second input of the at least one second synthesis channel, and
a clock control unit having at least first and second outputs coupled to control inputs of the first and at least one second synthesis channels whereby the at least one second synthesis channel receives a clock signal shifted in time with respect to a clock signal supplied to the first synthesis channel.

12. A synthesizer as claimed in claim 11 comprising:
a plurality of further second synthesis channels each connected in cascade to said output of the phase accumulator and each having a second input for receiving a frequency-dependent constant phase value signal, wherein each of the second synthesis channels includes an adder member connected between an input of its respective signal converter and its respective first and second inputs, each said first input being coupled to said output of the phase accumulator, whereby each said adder member combines signals from the output of the phase accumulator and its said respective frequency-dependent constant phase value signal.

13. A synthesizer as claimed in claim 12 comprising a of $k-1$ of the second synthesis channels each with a said second input that receives a different frequency-dependent constant phase value signal, each of said first inputs of the second synthesis channels receiving frequency-dependent phase value signals in accordance with $(i-1)\phi/K$ wherein i is a positive integer from 1 to K and represents an individual synthesis channel of the first and second and $\phi$ is the phase increment received at the input of the phase accumulator, and wherein each second synthesis channel receives at its control input a delayed clock signal.

14. A synthesizer as claimed in claim 12 wherein said signal converters in the first and second synthesis channels comprise at least one read only memory or random access memory thereby to synthesize arbitrary signal-time functions.

15. A synthesizer as claimed in claim 14 wherein each digital/analog converter includes a transfer memory which receives a respective clock signal from the clock control unit, which clock signal is delayed by $(i-1)T_T/K$, wherein i is a positive integer from 1 to K and represents an individual synthesis channel of the first and second and $T_T$ is the clock signal period, and wherein said clock control unit also applies clock signals to the phase accumulator.

16. A synthesizer as claimed in claim 14 wherein;

each digital/analog converter includes a transfer memory which receives a respective clock signal from the clock control unit, said adding member provides a subtraction function, the clock signal received at the transfer memories provide a time delay for an $i^{th}$ synthesis channel with respect to the $K^{th}$ synthesis channel in accordance with $(K-i)T_T/K$, where i is a positive integer from 1 to K represents an individual synthesis channels of the first and second and $T_T$ is the clock signal period, and wherein said clock control unit also applies clock signals to the phase accumulator.

17. A synthesizer as claimed in claim 14 wherein:

each digital/analog converter includes a transfer memory which receives a respective clock signal from the clock control unit, each second synthesis channel includes a respective dead time member connected in cascade with the respective signal converter and the respective digital/analog converter, said dead time member having a dead time $(i-1)T_T/K$, wherein i is a positive integer from 1 to K and represents an individual synthesis channel of the first and second and $T_T$ is the clock signal period, the clock signals received by the transfer memories are equal in time, and wherein said clock control unit also applies clock signals to the phase accumulator.

18. A synthesizer as claimed in claim 14 wherein the digital/analog converters have switching times which are short with respect to the quotient of the clock signal period and a factor K, where K is the number of the first and second synthesis channels.

19. A synthesizer as claimed in claim 11 wherein each signal converter is a sawtooth-to-sine converter whereby said output terminal provides a sinusoidal waveform signal.

* * * * *

UNITED STATES PATENT AND TRADEMARK OFFICE
CERTIFICATE OF CORRECTION

PATENT NO. : 5,162,745
DATED : November 10, 1992
INVENTOR(S) : Claus Koken

It is certified that error appears in the above-indentified patent and that said Letters Patent is hereby corrected as shown below:

Column 5, line 18, change "sT" to --$s_1$--;
        line 60, after "to" insert --the--.

IN THE CLAIMS
Claim 1, col. 6, line 62, after "member" insert a comma;
        line 63, after "second" insert --synthesis channel--;
        line 65, delete "further";
    col. 7, line 4, delete "parallel".

Claim 2, col. 7, line 10, delete "further".

Claim 4, col. 7, line 27, after "the" insert --clocked--;
        line 28, change "in the respective" to --to respective transfer--;
        line 29, before "first" insert --in the--.

Claim 11, col. 8, line 21, change "applying" to --supplying--.

Claim 13, col. 8, line 44, delete "a";
        line 45, delete "of" (first occurrence);
        line 47, change "first" to --second--;
        line 52, after "second" insert --synthesis channels--.

UNITED STATES PATENT AND TRADEMARK OFFICE
CERTIFICATE OF CORRECTION

PATENT NO. : 5,162,745
DATED : November 10, 1992
INVENTOR(S) : Claus Koken

It is certified that error appears in the above-indentified patent and that said Letters Patent is hereby corrected as shown below:

Claim 15, col. 8, line 67, after "second" insert --synthesis channels--.

Claim 16, col. 9, line 13, after "K" insert --and--;
line 14, change "channels" to --channel--; after "second" insert --synthesis channels--.

Claim 17, col. 10, line 7, after "second" insert --synthesis channels--.

Signed and Sealed this

Twenty-fifth Day of October, 1994

Attest:

BRUCE LEHMAN

Attesting Officer

Commissioner of Patents and Trademarks